Feb. 15, 1938.　　　C. P. BARTGIS　　　2,108,637
TESTING APPARATUS
Filed May 1, 1936
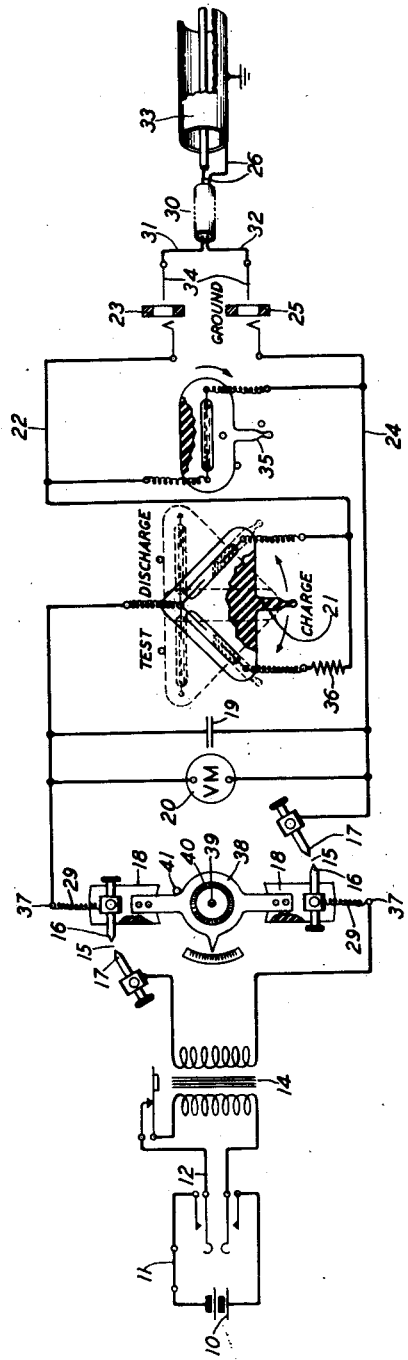
INVENTOR
C. P. BARTGIS
BY
ATTORNEY Patented Feb. 15, 1938

2,108,637

UNITED STATES PATENT OFFICE 2,108,637

TESTING APPARATUS

Charles P. Bartgis, Chatham, N. J., assignor to Bell Telephone Laboratories, Incorporated, New York, N. Y., a corporation of New York Application May 1, 1936, Serial No. 77,328

7 Claims. (Cl. 175—265)

This invention relates to an electrical testing arrangement, and more particularly to a method of testing for and removing faults from electrical apparatus.

In the manufacture of coaxial conductors especially those of small diameters, faults, or imperfections, comprising slivers, or hair-like projections, of copper extending in a continuous metallic path between the inner and outer conductors and causing short circuits therebetween have been frequently encountered. These faults may occur at different points along the length of the coaxial conductor. Similar faults have also been found in the field after factory approved conductors had been pulled into ducts. In the latter case, the removal of the faults in isolated locations by a suitable potential would be a difficult operation since adequate power facilities would very likely be unavailable along a line designed exclusively for the transmission of intelligence.

It is an object of the invention to provide a method of testing for and removing faults from coaxial conductors.

It is another object of the invention to provide a portable and compact apparatus embodying a self-contained power supply so as to be capable of expeditious operation in either the factory or the field.

In a preferred embodiment of the invention, a dry cell source of power is adapted to charge a condenser to a predetermined magnitude of potential and subsequently, the condenser is discharged through a relatively large resistance into a coaxial conductor to be tested. Irrespective of whether a fault is present or not, the potential decreases to some extent. A slow decrease indicates a non-faulty conductor while a sharp decrease indicates a faulty one. Accordingly, the condition of the coaxial conductor is quickly ascertained by measuring the leakage of potential therethrough.

In the event of a fault, the condenser charge is directly impressed on the coaxial conductor thereby effecting a high amperage discharge through the points of fault. This results in either partial or complete fusion of the copper slivers depending on their nature and quantity. Thereafter, the condenser is charged and discharged in the above manner until a non-faulty condition is attained.

The invention may be more readily comprehended from the following description taken together with the accompanying drawing which is a diagrammatic circuit illustrating the preferred embodiment of the invention.

In the preferred embodiment, a low direct-current voltage supply 10 comprising a suitable number of dry cells is connected through a S. P. S. T. non-locking switch 11 to the fixed contacts of a normally open switch 12. The dry cells may be of any well-known commercial type and are selected so that each cell has an initial voltage of approximately 1.5 volts. The switch 12 is connected across the low tension winding of a spark coil 14 of a suitable type such, for example, as the type used in a Model T Ford automobile. The functions of the switches 11 and 12 will be more fully explained hereinafter. The high tension winding of the spark coil is connected through spark gaps 15, 15 across a condenser 19. The spark coil changes the low direct-current voltage into a high alternating-current voltage of unsymmetrical form. This is rectified by the spark gaps into a direct-current component which is used to charge the condenser.

Each spark gap is preferably of the point-to-point type, and is determined by a movable point 16 and a fixed point 17. Each movable point is affixed to a block 18 of electrical insulating material and is connected by a flexible lead 29 to a fixed terminal 37. The blocks 18 are suitably attached to a plate 38, pivoted at 39 and actuated manually by a handle 40 of electrical insulating material. A stop 41 fixes the maximum length of the spark gap. It will be understood that this is but one of several mechanical arrangements that would be satisfactory for effecting adjustments of the spark gaps.

The adjustability of the spark gaps provides a control for determining the magnitude of the charge that can be built up on the condenser since an inadvertent attempt to build up an overcharge would result in a breakdown across the spark gaps. This would, of course, necessitate a reestablishment of the charge on the condenser. Inasmuch as it is contemplated that various sizes of coaxial conductors will be tested in a manner that will be subsequently described, it is imperative that the condenser charge be limited to a predetermined magnitude for each size. In this way, therefore, the danger of deleteriously affecting the conductors due to excessive voltages will be avoided. The spark gaps may be calibrated in terms of the magnitude of the charge that can be built up on the condenser. Such a calibration would facilitate the use of the apparatus with various sizes of coaxial conductors.

It will be understood that the condenser 19 may also consist of several condensers arranged in parallel, series, or parallel-series relation depending on the desired magnitude of operating charge. Obviously, the dry cell voltage may be varied to facilitate a charging of any arrangement of condensers. An electrostatic voltmeter 20 of a suitable type such, for example, as the Ferranti, is connected across the terminals of the condenser by a readily detachable arrangement, not shown. The latter is provided so that the voltmeter may be quickly disassociated from the apparatus during transportation, thereby obviating the possibility of damaging the instrument.

A three-position switch 21 and a lead 22 connect one terminal of the condenser to a testing jack 23 while a lead 24 connects the other terminal of the condenser to a testing or ground jack 25. A flexible cable 30 comprising suitably insulated leads 31 and 32 is interposed between the testing apparatus and a coaxial conductor 33 to be tested. One end of each of the leads 31 and 32 is provided with a plug 34 for insertion into the jacks 23 and 25 while the opposite end of each is provided with a universal clip 26 for attachment to the inner and outer conductors of the coaxial conductor. The lead 32 connects the ground jack 25 to the outer conductor.

A two-position switch 35 connected across the testing jacks 23 and 25 is normally operated to short-circuit the output of the condenser so as to protect the operator against accidental shock while arranging the apparatus before and after a test. The actuations of this switch will be subsequently explained. The switches 21 and 35 are of well-known mercury-contact types.

The switch 21 is placed in the "charge" position while the condenser is being charged; in the "test" position while the coaxial conductor is being tested for a short-circuiting fault; and in the "discharge" position when the condenser charge is to be directly impressed across the coaxial conductor. In the "test" position, a relatively high resistance 36 is connected in series with the inner conductor to substantially reduce the effective potential of the condenser while analyzing the coaxial conductor for a fault. The function of the resistance 36 will be more adequately described hereinafter.

The control apparatus may be suitably mounted on a control panel (not shown) of suitable insulating material which may be hinged to and form one side of a box housing the remainder of the apparatus such that access to the interior of the housing can be had only by raising the control panel which, as a safety precaution, has the non-locking switch 11 affixed to the underside thereof. When the control panel is raised, the switch 11 is opened.

In operation, the coaxial conductor to be tested is connected in the above manner to the testing jacks by the cable 30. The spark gaps are adjusted to provide a predetermined magnitude of condenser charge depending on the size of the coaxial conductor to be tested. With the switch 21 set initially in its "charge" position and the voltmeter connected across the condenser, the switch 12 is operated to impress the dry cell voltage on the low tension winding of the spark coil. This starts the charging of the condenser. As soon as the voltmeter indicates that the condenser has received the desired magnitude of charge, the switch 12 is released and the charging ceases. The switch 21 is then moved to its "test" position. Switch 35 is now actuated to and held in the released position to discharge the condenser into the coaxial conductor through the resistance 36 as above described.

Irrespective of whether short-circuiting slivers of copper are extending in a continuous metallic path between the inner and outer conductors or not, the condenser potential will decrease to some extent. A slow decrease due to a charging of the coaxial conductor would indicate the non-existence of short-circuiting faults, whereas a sharp decrease would indicate the existence of short-circuiting faults due to the copper slivers. Therefore, the rate of potential decrease may be construed as instantaneously analyzing and reporting the condition of the coaxial conductor.

In the event of a fault, the switch 21 is actuated to the "discharge" position to directly impress the condenser charge on the coaxial conductor. This will result in a high amperage current discharge through the points of fault tending to fuse the copper slivers, either partially or completely, depending on their size and quantity. Thereafter, the aforedescribed procedure for the charging and discharging of the condenser is repeated until the copper slivers are fused to an extent that the voltmeter with the switch 21 in the "test" position indicates a slow decrease of the charge. This, as hereinbefore described, assures a complete elimination of the fault.

While the invention is described with particular reference to faults comprising continuous metallic paths extending between the inner and outer conductors, it is equally applicable to faults consisting of copper slivers projecting transversely from the inner surface of the outer conductor toward but not in engagement with the periphery of the central conductor. As a result of the latter type of fault, a relatively small air-gap intervenes between the copper slivers and the central conductor.

It is seen, therefore, that the use of dry cells provides a self-contained source of power thereby rendering the apparatus independent of external sources of power. Accordingly, the apparatus is capable of expeditious operation in the most remote and isolated of field locations.

It is to be understood that the invention is capable of other modifications to those skilled in the art, and is to be limited only by the scope of the appended claims.

What is claimed is:

1. In a coaxial conductor having copper projections extending in continuous metallic paths between the inner and outer conductors at spaced points along the length of the coaxial conductor, the method of interrupting the paths which consists in placing a charge of predetermined magnitude on a condenser, discharging the condenser into the coaxial conductor to test for the projections, and discharging the condenser into the coaxial conductor to disintegrate the projections, the charging and discharging being repeated until complete disintegration is effected.

2. The method of removing faults due to copper slivers extending in a continuous metallic path between the inner and outer conductors of a coaxial conductor and tending to cause short circuits therein which consists in charging a condenser with a potential of predetermined magnitude, impressing the potential on the coaxial conductor through a resistance to produce an indication of a fault, and upon the latter indication directly impressing the potential on the coaxial conductor to fuse the copper slivers, the charging and discharging being repeated until the fused state of the copper slivers serves to interrupt the metallic path.

3. In an apparatus for fusing copper slivers extending between the inner and outer conductors of a coaxial conductor, the combination comprising a source of voltage of predetermined magnitude for fusing the slivers, means for connecting the source across the inner and outer conductors, means for reducing the strength of the current from the source, and switching means associated with the connecting means and adapted in one position to connect the potential source across the inner and outer conductors through the reducing means and in another position to connect the potential source directly across the inner and outer conductors.

4. In an apparatus for fusing copper slivers extending between the inner and outer conductors of a coaxial conductor, the combination comprising a source of alternating current potential, a rectifier, circuit means connecting the rectifier to the source, a condenser, terminals connecting the condenser across the output of the rectifier, the rectifier operating to charge the condenser with a voltage of predetermined magnitude for fusing the copper slivers, leads connecting the condenser across the inner and outer conductors, means for reducing the strength of the current from the condenser, and a three-position switch associated with the connecting leads, the switch being connected in the connecting leads such that in a first position the connecting leads are interrupted during the charging of the condenser, in a second position the reducing means is short-circuited, and in a third position the reducing means is included in the connecting means.

5. In an apparatus for fusing copper slivers extending between the inner and outer conductors of a coaxial conductor, the combination comprising a source of alternating current potential, a rectifier, circuit means connecting the rectifier to the source, a condenser, terminals for connecting the condenser across the output of the rectifier, the rectifier operating to charge the condenser with a voltage of predetermined magnitude for fusing the copper slivers, leads connecting the condenser across the inner and outer conductors, a resistor for reducing the strength of the current from the condenser, and switching means connected to the connecting means, the switching means being connected in one position to shunt the resistor and in another position to include the resistor in the connecting leads.

6. In an apparatus for fusing copper slivers extending between the inner and outer conductors of a coaxial conductor, the combination comprising a source of direct current of low voltage, a spark coil for changing the low direct current voltage into a high alternating current voltage, means for connecting the source to the spark coil, spark gaps bridged across the output of the spark coil for rectifying the alternating current voltage, a condenser, terminals for connecting the condenser to the spark gaps, the spark gaps operating to charge the condenser with a voltage of predetermined magnitude for fusing the copper slivers, leads connecting the condenser across the inner and outer conductors, a resistor for reducing the strength of the current from the condenser, and switching means connected to the connecting leads, the switching means being connected in one position to shunt the resistor and in another position to include the resistor in the connecting leads.

7. In a coaxial conductor having metallic slivers projecting from the outer conductor toward the inner conductor at one or more spaced points along the length of the coaxial conductor and in such a manner as to create relatively small air-gaps between the inner conductor and the slivers, the method of increasing the air-gaps which comprises placing a charge of predetermined magnitude on a condenser, discharging the condenser into the coaxial conductor to test for the air-gaps, and discharging the condenser into the coaxial conductor to fuse the slivers to increase the air-gaps, the charging and discharging being repeated until the air-gaps are increased to a certain length.

CHARLES P. BARTGIS.